United States Patent [19]

Barrows

[11] Patent Number: 4,598,796
[45] Date of Patent: Jul. 8, 1986

[54] LUBRICATOR

[75] Inventor: Robert E. Barrows, Fincastle, Va.

[73] Assignee: Ingersoll-Rand Company, Woodcliff Lake, N.J.

[21] Appl. No.: 704,504

[22] Filed: Feb. 22, 1985

[51] Int. Cl.⁴ .......................... F16N 1/10; F16N 13/06
[52] U.S. Cl. ...................................... 184/42; 184/55.2
[58] Field of Search ............... 184/55 A, 55 R, 56 R, 184/42, 6.24; 417/392, 489, 566; 137/860; 251/DIG. 1

[56] References Cited

U.S. PATENT DOCUMENTS

| | | | |
|---|---|---|---|
| 1,366,151 | 1/1921 | Astrom | 417/566 |
| 2,313,284 | 3/1943 | Valentine | 417/566 |
| 3,129,788 | 4/1964 | Heckt | 184/55 R |
| 3,664,371 | 5/1972 | Schneider | 137/860 |
| 4,152,031 | 5/1979 | Maguire | 184/6.24 |
| 4,450,938 | 5/1984 | Davenport | 184/42 |

*Primary Examiner*—Leonard E. Smith
*Assistant Examiner*—Jane E. Obee
*Attorney, Agent, or Firm*—B. J. Murphy; A. N. Trausch, III

[57] ABSTRACT

The lubricator of the invention is a one-shot or non-continuous type. It has a first reservoir within which to receive a charge of lubricant, and a second reservoir from which to expel a charge of lubricant, and a piston slidable therebetween for moving lubricant from the first reservoir to the second reservoir, and also for discharging lubricant from the second reservoir and externally of the lubricator. Upon the piston moving, slidably, in a first direction it creates a partial vacuum in the first reservoir and, consequently, ingests lubricant into the first reservoir. Then, as the piston moves in the second, opposite direction, it diminishes the volume of the first reservoir, and displaces lubricant therefrom through a channel formed centrally in the piston. The lubricant conducted through the channel is deposited in the second reservoir, and is expelled therefrom, by the piston, when next the piston moves in the first, slidable direction.

4 Claims, 1 Drawing Figure

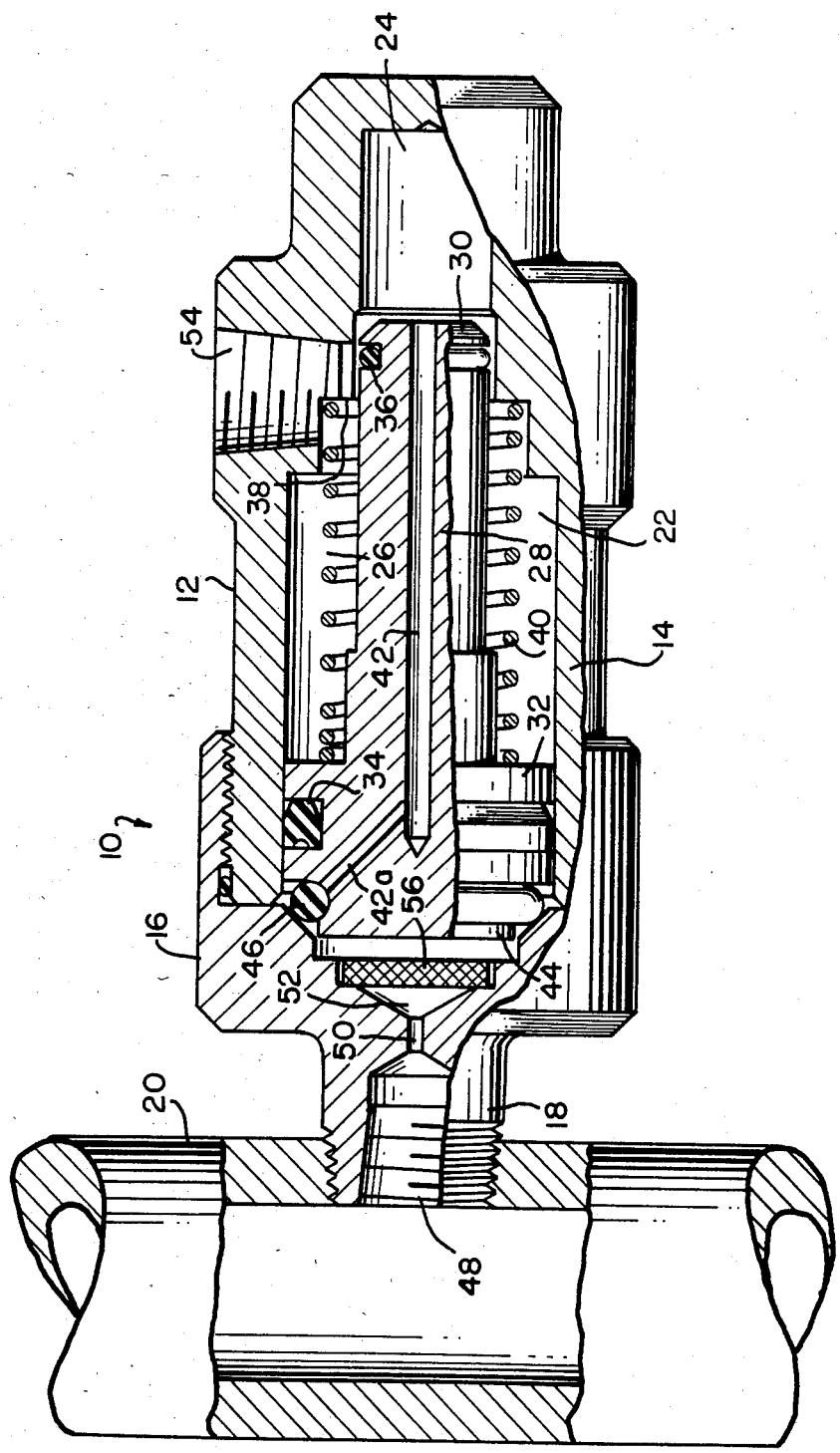

LUBRICATOR

This invention pertains to lubrication devices, and in particular to non-continuous or one-shot type lubricators such as are used for single injection lubrication of machinery or apparatus, such as air motors.

Non-continuous or one-shot type lubricators are especially useful for lubrication of machinery or apparatus, viz., air motors, which commonly operate for short durations of time. For such lubrication applications, one shot or one injection of lubricant, at the beginning of the operation of the machinery or apparatus, is sufficient for the brief operational duration.

Prior art one-shot lubricators, typically, employ a check-ball valve, and are self-priming. However, these known lubricators frequently experience problems arising from an unduly pressurized lubricant supply. In the latter circumstance, the lubricator will proceed to malfunction, and lubricant will flow continuously therethrough, from the lubricant supply line, to the using end item (air motor, or the like). Of course, this not only floods the end item, but also wastes lubricant.

It is an object of this invention to set forth a lubricator of the one-shot type of simple and inexpensive manufacture which, nonetheless, will not exhibit the faulty, through-flow of lubricant with a pressurized supply of lubricant.

It is particularly an object of this invention to set forth a lubricator, comprising a housing; said housing having a chamber formed therewithin; and means within said housing subdividing said chamber into a pair of separate, lubricant-receiving reservoirs; said housing having a first port formed therein which opens into one of said reservoirs for supplying lubricant thereto; and said housing having a second port formed therein which opens into the other of said reservoirs for expelling lubricant therefrom; wherein said subdividing means comprises means for moving lubricant from said one reservoir to said other reservoir.

Further objects of this invention, as well as the novel features thereof, will become more apparent by reference to the following description, taken in conjunction with the accompanying FIGURE, the latter being a cross-sectional view of an embodiment of the invention which represents the best mode contemplated by me for carrying out the invention.

As shown in the FIGURE, the embodiment of the lubricator 10 comprises a housing 12 constituted of a cylindrical body 14 and an end cap 16. The body 14 and end cap 16 are externally and internally threaded, respectively, for threadedly mating together. The end cap 16 also has a reduced-diameter portion 18 which defines an adapter for threadedly engaging and communicating with a source of pressured fluid. In the exemplary arrangement shown, portion 18 is threadedly intruded into a compressed air supply conduit 20 which communicates with an air motor (not shown). As will be understood, conduit 20 supplies operative compressed air to the air motor, and the lubricator 10 expels lubricant into the conduit for lubrication of the air motor.

Housing 12 defines a chamber 22 therewithin. Chamber 22 has a first cylindrical portion 24 at one end thereof which opens into a second, larger cylindrical portion 26. A dual-ended piston 28 is slidably disposed in the chamber 22. A first plunger-type end 30 of the piston reciprocates within cylindrical portion 24, and in close-fitting engagement with the walls of said portion.

Adjacent the opposite end of the piston 28 is formed a circular land 32 which reciprocates in close-fitting engagement with the inner surface of cylindrical portion 26. Land 32 carries a seal 34 to define a sealing engagement with the latter-mentioned surface, and end 30 carries a seal 36 to define a sealing engagement between the end 30 and the inner surface of portion 24.

An annular shoulder 38 formed within the body 14 receives one end of a compression spring 40. The other end of the spring 40 bears against land 32 to urge the piston 28 normally in the disposition shown. The piston 28 has a channel 42 formed centrally therethrough from one end thereof to open onto the cylindrical portion 24, and to adjacent the other end thereof. Piston 28 has a nose portion 44 at the end thereof opposite the plunger-type end 30. A narrow bore 42a communicates the channel 42 with the base of the nose portion 44. However, an O-ring seal 46 is set about the base of the nose portion 44 to close off the bore 42a.

Portion 18 of the end cap 16 has a port 48 formed therein which reduces into a metering orifice 50. Orifice 50 opens into an area 52 of chamber 22 which is sealed off from the rest of chamber 22 by the seal 34. Area 52 defines a second lubricant-receiving reservoir, whereas chamber 22 generally and cylindrical portion 24 thereof in particular, define a first lubricant-receiving reservoir. The lubricator 10 admits lubricant into the first reservoir, i.e., chamber 22 and its portion 24, and conducts it, via the channel 42, to the second lubricant-receiving reservoir, i.e., area 52, to be expelled from the latter. To this purpose, body 14 has a lubricant-supply port 54 formed therein for communication both the chamber 22 and its cylindrical portion 24. Finally, between the flat end surface of the nose portion, which flat end surface comprises a fluid-impingement surface for compressed air from conduit 20, and the metering orifice 50, is interposed a filter element 56. Element 56 filters such lubricant as is passed therethrough, and is purged of particulate by compressed air conducted therethrough, in a contrary direction, from the conduit 20.

Typical operation of the lubricator 10 will be explained as it will function in lubrication of an air motor, although such an air motor is not shown. Compressed air is conducted through conduit 20 to such an air motor, to cause operation thereof, and some of the air will enter the lubricator 10 via the port 48 and metering orifice 50. Consequently, the piston 28 will be moved against the bias of the spring 40. The plunger-type end 30 of the piston 28 will enter the cylindrical portion 24 of the body 14 and force any lubricant therewithin out through the channel 42, and under the seal 46, into area 52. When the air motor is shut down, the compressed air supply through the conduit 20 ceases; therefore, the spring 40 is free to return the piston to the extreme left-hand disposition (as shown in the FIGURE). Upon returning to this disposition, the piston 28 does two things. For one, it expels lubricant priorly conducted to area 52 therefrom and into the conduit 20. Such expelled lubricant, then, is positioned for conduct to the air motor (or whatever) when next it is turned on again. Also, the aforesaid return of the piston 28 to its normal position creates a partial vacuum in cylindrical portion 24; this partial vacuum ingests lubricant from the supply thereof which is in communication with port 54. This ingested lubricant, then, awaits another translation of the piston 28, contrary to the bias of the spring 40, for its transfer, via channel 42 (and bore 42a), to the alternative repository or reservoir of area 52.

The end of cylindrical portion 24 which communicates with the port 54 has a slightly greater diameter than the remainder of portion 24. This provides a fine clearance through which the vacuum-ingested lubricant can negotiate past the end of the plunger-type end 30 of the piston 28 to enter portion 24 therebeyond.

Consider now the situation in which the lubricant supply at port 54 becomes unduly pressurized. Here, it will be appreciated, the lubricant is quite effectively prevented from flowing through lubricator 10. The piston 28 is held fast against the inner surface of the end cap 16, and the O-ring seal 46 is sealingly compressed between the latter surface and the nose portion 44. The seal 46 cannot lift from the bore 42a, and the piston 28 cannot withdraw from area 52.

While I have described my invention in connection with an embodiment thereof which represents the best mode contemplated by me for carrying out the invention, it is to be clearly understood that this is done only by way of example and not as a limitation to the scope of my invention, as set forth in the objects thereof and in the appended claims.

I claim:

1. An air line lubricator comprising:
   a hollow housing defining a chamber having two different cross sectioned areas;
   a stepped piston sealingly movable in said chamber to form two variable volume lubricant-receiving reservoirs in conjunction with said chamber;
   a first of said variable volume reservoirs formed by the smaller cross section area of said piston in said smaller cross section area of said chamber and in communication with a lubricant supply;
   a second of said variable volume reservoirs formed by the greater cross section area of said piston in said greater cross section area of said chamber and located adjacent and in communication with an air line;
   means for drawing lubricant from said lubricant supply to said first variable volume reservoir and for expelling lubricant from said second variable volume reservoir when said piston moves in a direction to reduce the volume of said second variable volume reservoir;
   a conduit in said piston for conducting lubricant from said first variable volume reservoir to said second variable volume reservoir when said piston moves in a direction to reduce the volume of said first variable volume reservoir; and
   means for sealing said conduit to prevent lubricant leakage from said first variable volume reservoir when the volume of said second variable volume reservoir is at a minimum.

2. An air line lubricator according to claim 1 wherein said sealing means is an O-ring positioned in said greater cross section area of said chamber such that said O-ring seals said conduit only when the volume of said second variable volume reservoir is at a minimum.

3. An air line lubricator according to claim 2 wherein air pressure urges said piston in a direction to reduce the volume of said first variable volume reservoir and a spring urges said piston in a direction to reduce the volume of said second variable volume reservoir.

4. An air line lubricator according to claim 3 wherein a metering orifice and a filter element are interposed between said second variable volume reservoir and said air line.

* * * * *